UNITED STATES PATENT OFFICE.

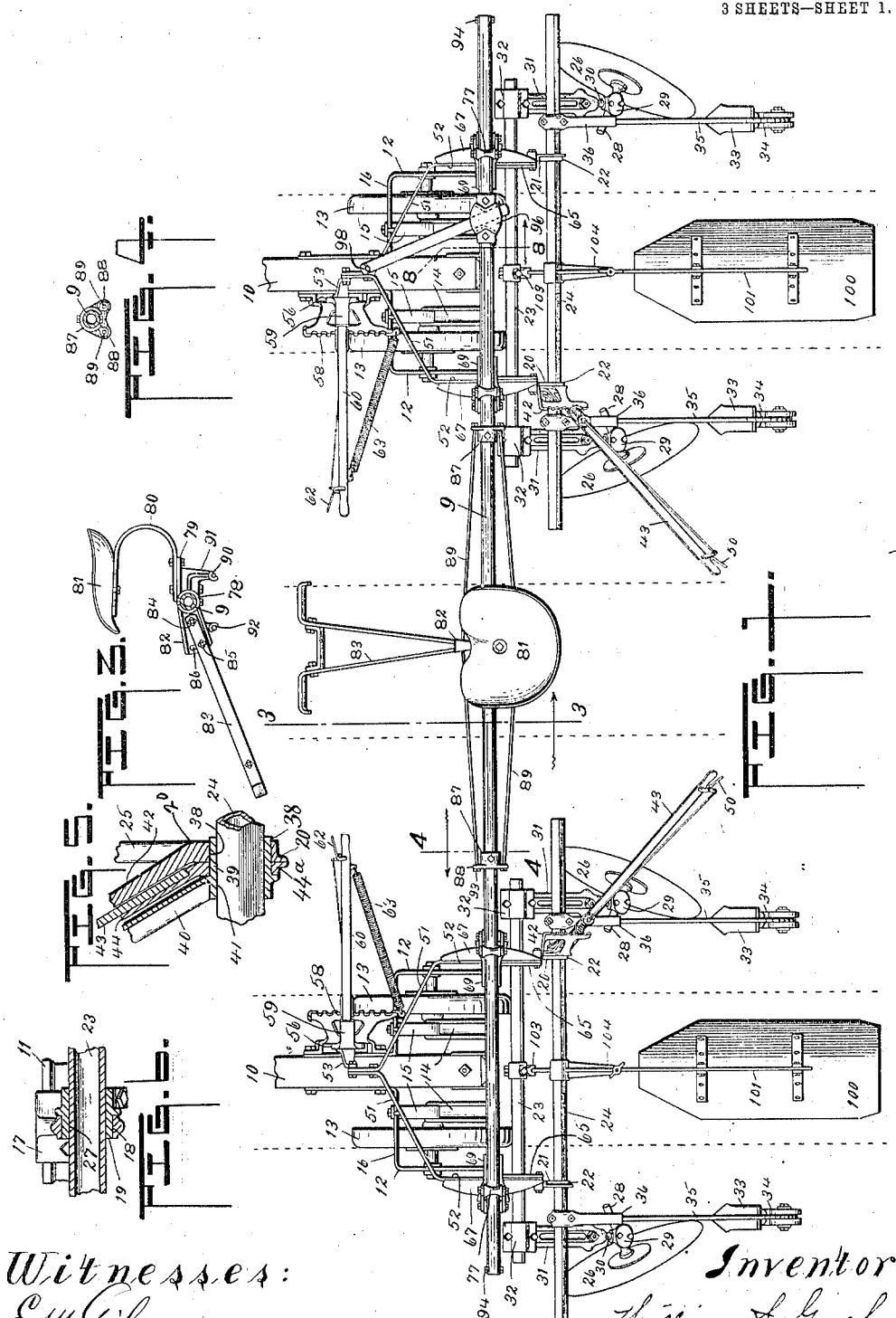

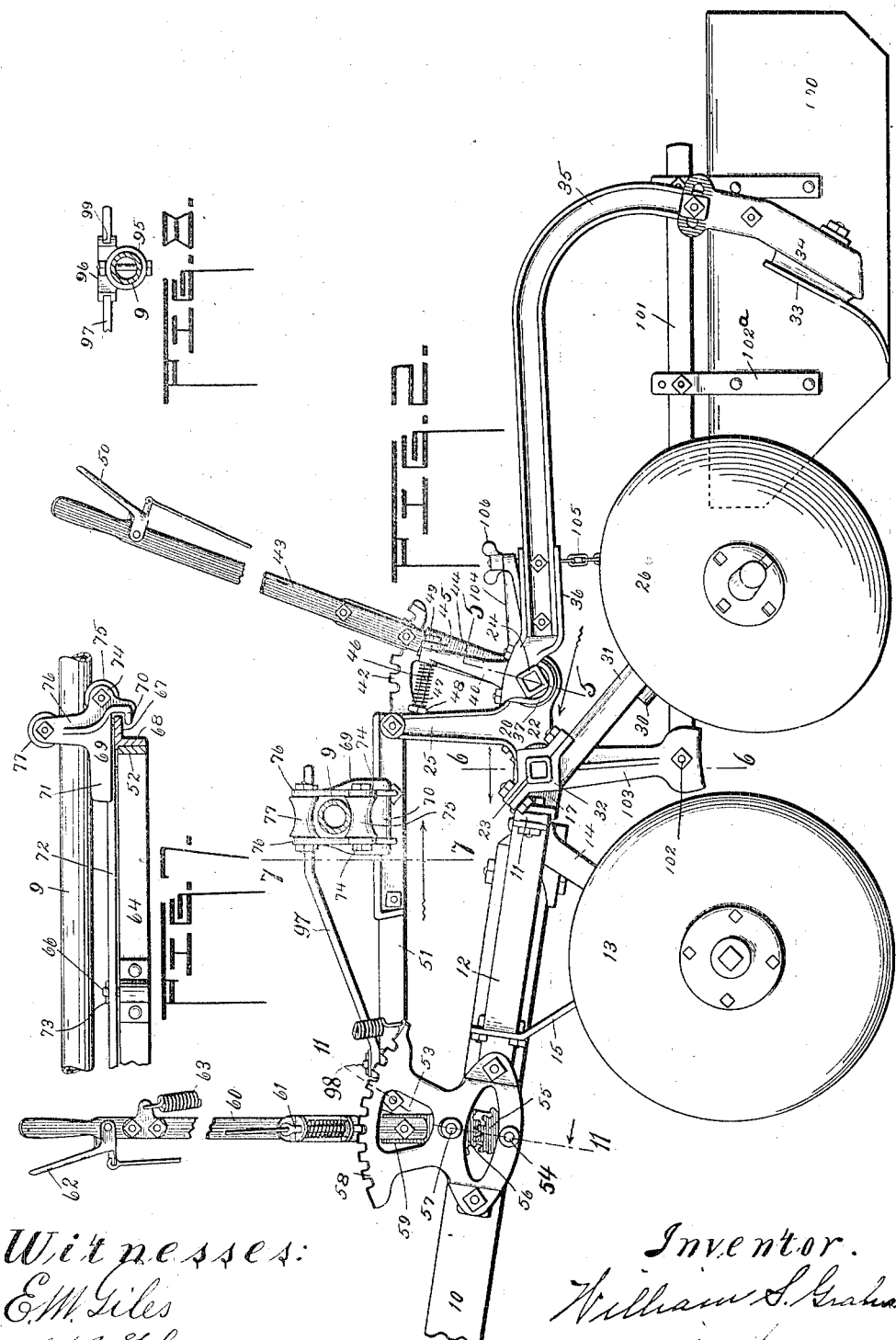

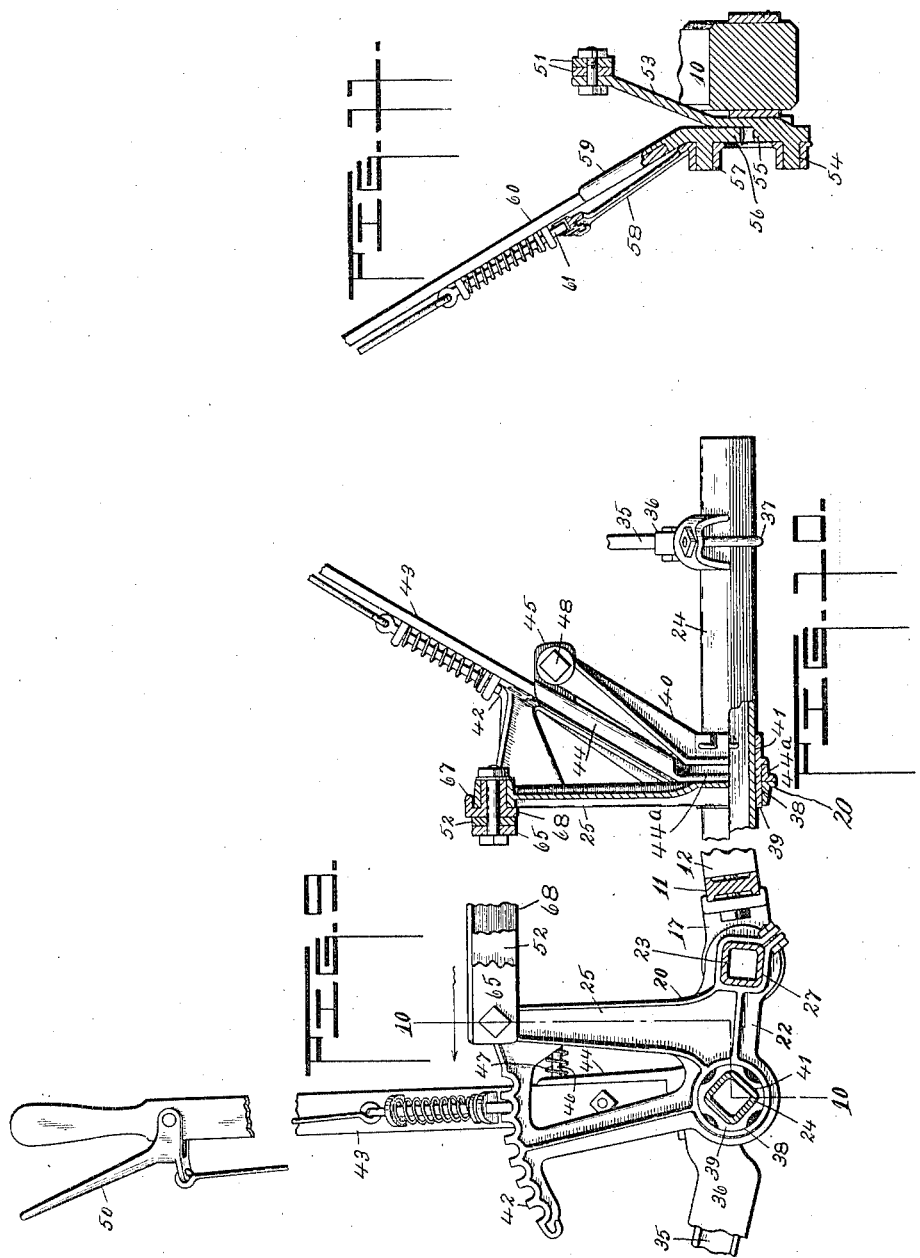

WILLIAM S. GRAHAM, OF CANTON, ILLINOIS, ASSIGNOR TO PARLIN & ORENDORFF CO., OF CANTON, ILLINOIS.

LISTER-CULTIVATOR.

955,510.

Specification of Letters Patent. Patented Apr. 19, 1910.

Application filed February 18, 1907. Serial No. 357,925.

*To all whom it may concern:*

Be it known that I, WILLIAM S. GRAHAM, a citizen of the United States, residing at Canton, in the county of Fulton and State of Illinois, have invented certain new and useful Improvements in Lister-Cultivators; and I do hereby declare that the following is a full, clear, and exact description of the invention, which will enable others skilled in the art to which it appertains to make and use the same.

This invention has reference more particularly to improvements in lister cultivators of that type in which individual gangs of cultivating devices, each furnished with its own pole or tongue, are connected by a transverse spreader member whereon the driver's seat is mounted.

The objects of my invention are, to connect the cultivator gangs with the spreader member so as to allow each gang greater freedom of movement; to provide improved means for controlling the movement and adjustment of the cultivating appliances; and to improve the details of the structure.

In the accompanying drawings, which illustrate my invention, Figure 1 is a plan view of a lister cultivator containing my improvements; Fig. 2 a side elevation of the cultivator gang at the right of Fig. 1, looking at the same from the inner side; Fig. 3 a side elevation of the driver's seat and its connection with the spreader member, taken on the line 3—3 of Fig. 1; Fig. 4 a cross sectional view through the spreader member on the line 4—4 of Fig. 1 looking as indicated by the arrow, showing the manner of connecting the brace rods of the driver's seat with the spreader member; Fig. 5 a fragmentary sectional view, somewhat enlarged, on the line 5—5 of Fig. 2 looking as indicated by the arrow, showing the connection of the shaft, that carries the shovels, with the frame of the cultivator whereby the shovels may be moved and adjusted independent of the other cultivator appliances; Fig. 6 a fragmentary sectional view somewhat enlarged on the line 6—6 of Fig. 2 looking as indicated by the arrow, showing the connection of the shaft that carries the cultivator disks with the truck frame; Fig. 7 a fragmentary view on the line 7—7 of Fig. 2 showing the horizontal pivotal connection of the spreader member with the cultivator gang; Fig. 8 a cross sectional view through the spreader member on the line 8—8 showing the parts that hold the spreader member from turning; Fig. 9 an enlarged view of the lever 20 and adjacent parts looking at the same from the inside of the cultivator gang; Fig. 10 a sectional view on the crooked line 10—10 of Fig. 9, looking as indicated by the arrow; and Fig. 11 an enlarged transverse sectional view taken through pivot points 54, 57 and the pivot of parts 51 and 53, looking toward the front of the machine.

This cultivator consists of two individual gangs of cultivating devices which are loosely connected one at each end of the spreader member 9. The cultivator gangs, except as hereinafter particularly pointed out, are constructed the same, consequently a description of one will suffice for both, like characters of reference being employed to designate corresponding parts of said cultivating gangs.

The tongue 10 of each gang of cultivating devices has the transverse bar 11 secured to the end thereof, and extending an equal distance each side thereof, and said bar, together with the braces 12 thereof form the frame which carries the truck wheels. Each gang has a pair of concave truck wheels 13 which are adapted to travel in the furrow along the edges thereof for guiding the cultivating devices and said wheels are mounted on stub axles extending laterally from the lower end of the brackets 14, the upper ends of which are formed to engage the bar 11 to which they are secured. These brackets which extend forwardly and downwardly, as shown, are connected with the bar 11 so that they may be adjusted along said bar to and from the tongue for increasing or decreasing the distance between the truck wheels, and have braces 15 which are secured to their lower ends and adjustably connected to the portions 16 of the braces 12, which said portions extend parallel with the bar 11, so that they may be adjusted to and from the tongue along said portion to correspond with the adjustment of the brackets 14 along the bar 11.

Near each end of the bar 11 a casting 17 is secured to the rear face thereof which said castings are provided with horizontal openings 18 which receive the sleeve like extensions 19 at the forward end of and on the outer side of the rocking levers which support the shafts that carry the cultivator appliances. These rocking levers which are indicated at 20 and 21 are located at the inner and the outer sides respectively of each cultivator gang and have the lower portion 22 with openings in each end thereof through which the shafts 23 and 24 which carry the cultivator appliances are passed and have the arm 25 which extends upwardly from the part 22 intermediate of the openings thereof and serves as a lever for rocking said brackets. The shaft 23 to which the disks 26 are connected, is preferably square and is secured in the square openings 27 in the forward ends of the rocking levers 20 and 21 and protrudes a sufficient length outside of each rocking lever to provide for the required lateral adjustment of the disks thereon. These disks which are of the usual type, are mounted on the short spindles 28 which are connected to the flattened portion 29 at the end of the rod 30 so that they may be adjusted on the inner side or outer side thereof at various angles in the customary manner, and the rods 30 sit in longitudinal grooves in the under face of the arms 31 and may be adjusted lengthwise thereof for moving the disks to and from the shaft 23. The upper ends of the arms 31 are clamped onto the shaft 23 as shown at 32 and may be adjusted lengthwise thereof for moving the disks nearer to or farther away from the furrow at the center of the machine. The shaft 24 which carries the shovels is likewise preferably square and passes through the openings at the rear of the rocking levers and extends outside of said rocking levers as shown in the drawings a suitable distance to provide for adjustment of the shovels to and from the center of the machine. These shovels 33 are of the usual type and are secured to the feet 34 which are adjustably connected at the lower rear end of the drag bars 35, the said drag bars being connected at their forward ends to the castings 36 which fit partially around the square shaft and are locked in place thereon by means of the U bolt 37 whereby they may be readily adjusted along said shaft 24.

It is designed that the shafts 24 be so mounted that they may be moved and adjusted independent of the other cultivator appliances and that they be arranged to yield somewhat in case the shovels carried thereby strike an obstruction and in furtherance of this object the opening in the rocking lever 21 through which the shaft 24 is passed is circular in form to permit free rotation of said shaft. The opening 38 (see Figs. 5, 9 and 10) in the rocking lever 20 is likewise circular and larger than the corresponding opening in the rocking lever 21 to receive the sleeve 39 which rotates freely therein. This sleeve projects inwardly from the lower end of the arm 40 which is disposed at the outer side of the rocking lever 20 and the opening 41 through said sleeve is preferably square and fits the shaft 24 so as to cause the shaft to turn with the movement of the sleeve and arm 40. Extending angularly away from the outer side of the rocking lever 20 to which it is secured is the segmental rack 42, the said rack being so inclined to bring the handle of the lever 43 which operates adjacent said rack within convenient reach of the driver whose seat is centrally arranged on the spreader member 9. Intermediate of the segmental rack 42 of the rocking lever 20 and the arm 40 is another arm 44 which is provided with a circular portion or loop 44$^a$ at the lower end thereof which surrounds a portion of the sleeve 39, and is thereby adapted to swing freely around the sleeve portion 39. This arm 44 which extends approximately to the top of the segmental rack, as does also the arm 40, is provided with a lug 45 extending outwardly at the top thereof, which has a perforation through which the bolt 46 is loosely passed. The end of the arm 40 which is in the arc of movement with the lug 45 is likewise perforated and receives the bolt 46 loosely through the opening thereof, and the spring 47 is interposed between the head 48 of the bolt and the arm 40 so as to draw the nut 49 of the bolt 46 against the lug 45 on the arm 44 and force the end of the arm 40 against said lug. The inner face of the arm 44 is grooved to receive the end of the lever 43 which is provided with the spring actuated pin operable by the lever 50 at the grip of the lever 43 for locking the lever in various positions of adjustment along the face of the rack 42 whereby the shaft 24 may be turned and the shovels 33 thereby raised and lowered.

As has been hereinbefore described, the arm 44 swings freely around the shaft 24 and the sleeve 39 on the end of the arm 40 embraces the shaft so as to cause the shaft to move with said arm 40 and the tension of the spring 47 is such as to hold the arm 40 against the lug 45 and cause the shaft 24 and the parts carried thereby to normally follow the movement of the lever 43. When the shovel 33 however, strikes an obstruction or is otherwise caused to rise, the arm 40 is moved away from the lug 45 against the tension of the spring 47 which returns the arm 40 to the normal position against the lug 45 as soon as the obstruction is passed.

Pivotally connected to the upper end of the arms 25 of the rocking levers 20 and 21 are secured strap irons which extend forwardly as at 52, thence inwardly as at 51 and have the meeting forward ends thereof secured together and form a swinging superstructure for operating the cultivator appliances and for supporting the spreader member. The forward end of this superstructure is pivoted to the upper end of the swinging lever 53 which is pivotally connected as at 54 at the inner side of the tongue. This lever 53 is provided on the outer side thereof adjacent the lower end with the segmental gear 55 which swings around the pivot 54 as a center and meshes with a corresponding segmental gear 56 pivoted as at 57 at the base of the segmental rack 58 which said segmental rack inclines inwardly as shown toward the driver's seat. The segmental gear 56 has the arm 59 extending upwardly which said arm is grooved to receive the end of the lever 60 and moves along the face of the rack 58 and extends inwardly a suitable distance to be within easy reach of the operator between the cultivator gangs. This lever 60 similarly to the lever 43 heretofore described has the spring pressed pin indicated at 61 which normally engages the teeth of the segmental rack and is operated by the lever 62 at the handle of the lever 60 for locking the lever in various positions of adjustment along the face of the rack.

As is apparent, the lever 53 by reason of the construction described is operated by the movement of the lever 60 in a direction opposite to the movement of said lever 60 and through the connection of the superstructure hereinbefore described with the ends of the arms 25 of the rocking levers swings said rocking levers on their pivotal connection with the parts 17 on the transverse bar 11 whereby a rotary movement is imparted to the shaft 23 and an arcuate movement is imparted to the shaft 24 around the shaft 23 as a center, the rearward movement of the levers 60 being sufficient to swing the shaft 23 to such a position as to lift the disks 26 from the soil and to move the shaft 24 so as to lift the shovels likewise from the soil the height to which the said shovels are raised being dependent upon the adjustment of the lever 43. As is apparent, the rearward movement of the lever 60 is resisted by the weight of the cultivator appliances and to facilitate such movement the spring 63 is provided which connects the upper end of the lever with the rear of the segmental rack and assists in throwing the lever to the rearward position.

About midway of the length of the portions 52, which as has been hereinbefore indicated are arranged parallel, one at each side of each cultivator gang, a rod or bar 64 extends transversely between said parts, the ends 65 thereof being turned rearwardly and securely fastened to the inner face of the portions 52, an upwardly projecting pin 66 being provided on said bar 64, intermediate of the portion 52 of the superstructure. On the outer face of each of the portions 52 and extending throughout the length of said portions is a part 68 which has a laterally projecting flange 67 at the top thereof on a plane with or a little above the edge of the portion 52 and the outer edge of the flange is curved to form an arc with the pin 66 as the center. Mounted on and arranged to ride on each flange 67 is a casting 69 which has a foot portion 70 hooked under the edge of the flange 67 to retain said casting in place thereon and said castings have the portion 71 projecting inwardly and provided with grooves in the under face thereof which are adapted to receive the end of the bar 72 to which they are secured, said bar being pivoted at its center on the pin 66 and held in place by the cotter pin 73 so as to swing about said pin as a center, the castings 69 in such movement riding upon the upper face of the flanges 67. As is shown, in the drawing, there is one of these castings at each side of each gang and said castings are provided with the outwardy projecting lugs 74 suitably distanced to receive the concave roller 75 therebetween upon which said rollers the tubular spreader member 9 is carried and permitted to move longitudinally. Extending upwardly at each side of the spreader member 9 is an arm 76 which said arms 76 have a similar concave roller 77 secured between the upper ends thereof for holding the spreader member in place on the roller 75, the vertical distance between the rollers 77 and 75 being sufficient to permit limited vertical movement of the tubular spreader member 9 between the arms 76. By means of this construction the spreader tube 9 which connects the cultivator gangs is capable of longitudinal movement across the top of each gang to allow said gangs to approach and recede to follow the furrows, the rollers 75 and 77 being provided to permit such movement with very little friction. Furthermore, the spreader tube is capable of swinging with the castings 69 around the pin 66 on each gang as a center and either gang is thus able to move freely ahead of or behind its companion gang without interfering with the operation of the cultivator. Loose engagement of the rollers 75 and 77 with the spreader member 9 also permits slight lateral tilting of either cultivator gang without gripping the spreader member.

As has been hereinbefore suggested, the driver's seat is carried on the spreader member intermediate of the cultivator gangs and there is provided a casting which has the sleeve portion 78 which embraces the spreader tube and is securely bolted thereto. Projecting rearwardly from this sleeve portion 78 is a flat table like portion 79 which has the plate spring 80 bolted thereto, the opposite end of which is disposed above the spreader tube 9 and has the seat 81 secured thereto and facing the front of the machine. Projecting forwardly from the sleeve like part 78 on line with the center of the seat is a part 82 to which the foot rest 83 is pivotally connected as at 84. The bolt 85 which passes through the rods of the foot rest some distance from the pivot bolt 84 also passes through the arcuate slot 86 near the end of said part 82 for adjusting the end of the foot rest to a higher or lower position. At each side of the seat and an equal distance therefrom are the collars 87 which are bolted to the shaft. These collars have the lugs 88 projecting angularly down at each side of the collar 87 a short distance, the said lugs being perforated to receive the ends of the truss rods 89 one of which engages the groove 90 in the arm 91 which projects downwardly from the plate 79 at the rear of the spreader rod and the other of which engages the groove 92 in the part projecting downwardly from the part 82 in front of the spreader rod 9, the said truss rods being provided with nuts 93 on the ends thereof whereby they may be drawn taut to brace the central portion of the spreader member and hold same against twisting. The collars 87 also serve as stops to limit the movement of the gangs toward the center of the spreader rod by engagement with the castings 69 and bolts 94 are provided which are passed horizontally through the ends of the spreader rod 9 to limit the movement of the cultivator gangs away from the center of the spreader rod.

For holding the spreader tube 9 from turning and to hold the seat 81 at all times in an upright position, the spreader tube is provided above one of the gangs and intermediate of the castings 69 thereon with an elongated sleeve 95 which has a flat part 96 thereabove which is slotted horizontally and transversely of the spreader tube to admit the flat rod 97 therethrough and permit considerable swing thereof in said slot. This flat rod 97 extends forwardly and downwardly from the spreader tube 9 and the forward end is horizontally pivoted to the meeting ends of the flat braces of the superstructure as at 98 so as to permit said rod to swing laterally across the cultivator gang the said rod being in all positions of its movement in engagement with the slot 99 so as to hold the spreader tube from turning. This construction holds the spreader tube from turning with reference to the cultivator gang upon which the construction above described is placed and tilting of the said cultivator gang longitudinally or from front to rear swings the spreader rod with it. The cultivator gang at the other end of the spreader rod, however, is free to swing around said spreader rod and permits tilting movement of each of said cultivator gangs longitudinally or from front to rear, independent of the other cultivator gang.

To protect the center of the furrows from earth which is thrown up by the disks 26 and the shovels 33, the shield 100 is provided on each cultivator gang which extends rearwardly therefrom and is adapted when the disks and shovels are lowered into their operative position to ride in the furrow and cover the center thereof. This shield is supported on the rod 101 to which the straps $102^a$ on the shield are bolted, the forward end of said rod being pivotally connected as at 102 to the lower end of the arm 103 which extends downwardly from the center of the shaft 23 and is secured thereto so as to turn with said shaft. Extending rearwardly from the shaft 24 at the center thereof is an arm 104 which is connected by means of the chain 105 with the rod 101 some distance from the pivot point 102, the said arm 104 being secured to the shaft 24 to turn therewith so that when said shaft is turned to raise the shovels the said arm 104 swings upwardly and raises the shield from the furrow. For connecting the chain 105 with the end of the arm 104 a hook bolt is provided which passes vertically through an opening in the end of the arm 104 and is furnished with the winged nut 106 whereby the hook bolt may be tightened or loosened. By means of this connection, a link of the chain 105 is fastened on said hook bolt which is then drawn upward by means of the winged nut to such a position as to hold the chain from engagement.

What I claim is:

1. In a cultivator, the combination of a frame supported on transporting means, a pair of rock shafts on said frame, each provided with cultivating appliances thereon, means for operating one of said rock shafts independent of the other rock shaft for moving the cultivating appliances carried thereby to and from the ground, and means for simultaneously operating both rock shafts independent of the transporting means to move the cultivating appliances carried by said rock shafts to and from the ground.

2. In a cultivator, the combination of a frame supported on transporting means, an adjustable part on said frame movable independent of the transporting means, a seat support on said adjustable part, a pair of rock shafts on said frame, each provided with cultivating appliances thereon, and means for adjusting said cultivator appliances relative to the adjustable part.

3. In a cultivator, the combination of a traveling frame, an adjustable part on said traveling frame provided with a seat support thereon, two sets of cultivating appliances mounted on said adjustable part and movable thereby to and from the ground, and means for operating one set of cultivating appliances to and from the ground independent of said adjustable part and the other set of cultivating appliances.

4. In a cultivator, the combination of a traveling frame, an adjustable frame on the traveling frame, a seat support on said adjustable frame, cultivator appliances connected with the adjustable frame and operable by the movement thereof to and from the ground, a rock shaft on said adjustable frame provided with cultivator appliances thereon, means for operating said rock shaft independent of the adjustable frame for adjusting the cultivator appliances to and from the ground.

5. A cultivator comprising a traveling frame, a rocking part on said frame, a shaft carried by said rocking part and provided with cultivating devices thereon, a second shaft carried by said rocking part and movable independent thereof, said second shaft being provided with cultivating devices thereon adapted to move to and from the ground by the independent movement of said shaft.

6. In a cultivator, the combination of a traveling frame, a swinging frame on the traveling frame, two rock shafts, each provided with cultivating appliances thereon mounted on the swinging frame and operable by the movement of the swinging frame to carry the cultivating appliances to and from the ground, and means for moving one of the rock shafts and cultivating appliances carried thereby independent of the other rock shaft and the swinging frame for moving the cultivating appliances thereon to and from the ground.

7. In a cultivator, the combination of a traveling frame, a swinging frame thereon provided with two sets of cultivating appliances mounted thereon, adapted in the movement of the swinging frame to be moved to and from the ground and a lock lever mounted on the swinging frame and provided with yielding means for operating one set of cultivating appliances to and from the ground independent of the other set of cultivating appliances.

8. A cultivator comprising a traveling frame, a rocking part on said frame, a shaft carried by said rocking part and adapted to move independently thereof, said shaft being provided with cultivating devices thereon adapted to be moved by the independent movement of said shaft to and from the ground, a lever for independently operating said shaft and provided with means engaging the rocking part for yieldingly holding said shaft against independent movement, a second shaft fixedly mounted in said rocking part, and a lever for moving said rocking part for actuating both of the shafts carried thereby to move the cultivator device carried thereby to and from the ground.

9. A multiple row cultivator, comprising a spreader-member substantially circular in cross-section, separate frames traveling on and guided by said spreader-member and movable toward and from each other, a horizontally-swinging arm pivotally connected with one of said frames and non-rotatably connected with the spreader-member, and cultivating devices connected with said frames.

10. A multiple row cultivator, comprising a spreader-member substantially circular in cross-section, separate frames traveling on and guided by said spreader-member and movable toward and from each other, a horizontally-swinging arm pivotally connected with one of said frames and non-rotatably connected with the spreader-member, cultivating devices connected with said frames, and a seat-support mounted on the spreader-member.

11. In a multiple row cultivator, the combination with separate cultivator sections, of a spreader-member carrying the seat-support, and means pivotally connected with one of the cultivator sections and having a longitudinally slidable relation with the spreader-member, for holding said spreader-member from turning circumferentially with reference to the connected cultivator section.

12. In a double row cultivator, the combination of a separate cultivator frame for each row, a horizontally rotary part on each frame, a circular spreader shaft connected with the horizontally rotary part on each cultivator frame, rollers on each horizontally rotary part engaging the upper and lower face of the shaft, and adapted to permit rotary and longitudinal movement of said shaft, a longitudinally slotted part on said spreader shaft adjacent one of the cultivator frames, and a horizontally pivoted rod on said adjacent cultivator frame engaging said slot in said slotted part for holding the spreader member from vertical rotation with reference to that particular cultivator frame.

13. In a double row cultivator, the combination of a separate cultivator frame for each row, a spreader member connecting said cultivator frame, a seat supporting casting on said spreader member intermediate of said cultivator frames and truss rods connected with the spreader member at each side of the seat casting and engaging portions of the aforesaid seat casting at the front and rear of the spreader member.

14. In a double row cultivator, the combination of a separate cultivator frame for each row, a shaft like spreader member connecting said cultivator frames, a seat supporting casting on said spreader member intermediate of the cultivator frames, a seat mounted on said seat casting, a foot rest extending forwardly from said seat casting, a part secured on the spreader member at each side of the seat casting and a pair of truss rods connecting said parts, one of said truss rods engaging a portion of the seat casting at the front of the spreader member, and the other of said truss rods engaging the portion of the seat casting at the rear of the spreader member.

15. A cultivator comprising a traveling frame, a shaft and lock lever pivoted on the same horizontal center, cultivating appliances on the said shaft adapted in the oscillation of the shaft to move to and from the ground, a part on the shaft adjacent the lock lever and a spring arranged to yieldingly hold said part against the lock lever for the purpose specified.

16. In a cultivator, the combination of a plurality of cultivator gangs, each mounted on a transporting means, a spreader member connecting the cultivator gangs, a pair of rock shafts in each cultivator gang, cultivator appliances connected directly with each rock shaft, means for operating both rock shafts simultaneously, independent of the transporting means, for moving the cultivator appliances carried thereby to and from the ground, and means for operating one of said rock shafts independently of the other.

17. In a cultivator, the combination of a plurality of cultivator gangs, each mounted on transporting means, a spreader member connecting the cultivator gangs, a rock shaft associated with each cultivator gang, a pair of arms secured to the rock shaft of each gang, a second rock shaft carried by each pair of arms, cultivator appliances secured to each rock shaft and means for operating one of said rock shafts independent of the other.

18. In a cultivator, the combination of a plurality of cultivator gangs, each mounted on transporting means, a spreader member connecting the cultivator gangs, a rock shaft connected with each cultivator gang, a second rock shaft connected directly with the first rock shaft and movable around the same as a center as it rocks, cultivator appliances secured to each rock shaft and means for operating one of said rock shafts independent of the other.

19. In a multiple row cultivator, the combination with separate row sections, of a spreader member carrying the seat support, means pivotally connected with one of the cultivator sections and having a longitudinally slidable relation with the spreader member for holding said spreader member from turning circumferentially with reference to the connected cultivator section, but free to turn with relation to the other section.

20. In a multiple row cultivator, the combination with separate row sections, of a bar connecting said sections in a manner to permit a longitudinally slidable relation between the bar and the sections, means pivotally connected with one of the cultivator sections and having a longitudinally slidable relation with the spreader member for holding said spreader member from turning circumferentially with reference to the connected cultivator section, but free to turn with relation to the other section.

21. In a multiple row cultivator, the combination with separate row sections, of a bar adapted to support a seat and supported in connection with said sections in a laterally slidable relation, a slotted member on said bar and an arm pivotally connected with one of the cultivator sections and projecting through the slotted member on the bar and having a longitudinally slidable relation therewith adapted to prevent the bar from turning with reference to the cultivator section with which it is connected while the other cultivator section is permitted to turn freely about said bar.

22. In a multiple row cultivator, the combination with separate row sections, of seat supports approximately round in cross section connecting the cultivator sections, a member on the seat support provided with a slot therethrough, said slot bearing longitudinally of said member, being larger from its center on either side to its other edge, and an arm pivoted to one of the cultivator sections with its free end projecting through the slotted member, said arm facilitating the holding of the spreader member from turning, and the slotted member permitting the arm to be projected therethrough to accommodate the varying distance between the point of pivoting of the bar and the spreader member, as the cultivator gang is moved longitudinally with reference to said bar.

In testimony whereof I have affixed my signature, in presence of two witnesses.

WILLIAM S. GRAHAM.

Witnesses:
  C. B. Reed,
  L. H. Gent.